United States Patent

[11] 3,604,091

[72] Inventor Hans H. Martin
 4424 Westphalen Arfkamp 14, Stadtlohn, Germany
[21] Appl. No. 840,791
[22] Filed July 10, 1969
[45] Patented Sept. 14, 1971

[54] METHOD AND APPARATUS FOR CHARGING A WELDING MACHINE FOR LIGHT BEAM GRATINGS
19 Claims, 4 Drawing Figs.

[52] U.S. Cl. .................................................. 29/200 A, 83/112, 83/160, 228/5
[51] Int. Cl. .................................................. B23q 3/00
[50] Field of Search .......................................... 29/200, 200 A, 200 B, 200 P, 429; 228/5; 83/112, 160

[56] References Cited
UNITED STATES PATENTS
3,427,701 2/1969 McDonnell ................... 29/200 B Primary Examiner—James M. Meister
Attorney—McGlew and Toren ABSTRACT: A continuous supporting bar strip is fed through a straightening machine and cut to the proper supporting bar lengths which are fed to a magazine. The number of supporting bars requisite for a selected size grating are lifted from the magazine and the height of the top surfaces of the lifted bars is adjusted to the level of the welding machine. The lifted bars are fed to the welding machine while the spacing of the lifted bars is adjusted. The steps are performed in a continuous repetitive sequence. The apparatus includes a support table with a shear adjoining a known straightening machine, and the strip leaving the straightening machine operates a first limit switch to stop the straightening machine and then operates a second limit switch to activate the shear to cut a bar length. A lifting truck cooperates with the supporting bar magazine to lift the requisite number of strips from the latter, and an adjusting reed is positioned between the lifting truck and a welding and pressing machine to adjust the spacing of the lifted bars as they are fed to the welding and pressing machine.

INVENTOR
HANS H. MARTIN
By: McGlew and Toren
Attorneys

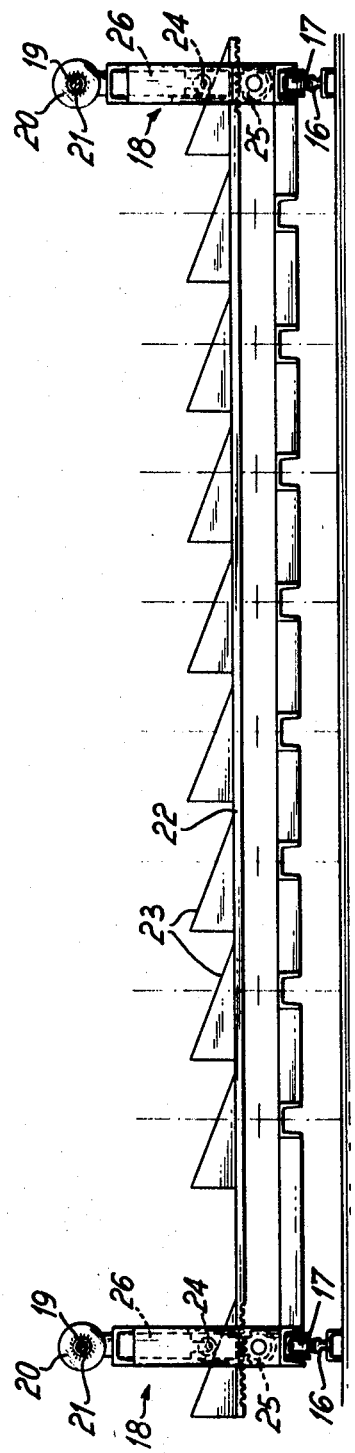

3,604,091

METHOD AND APPARATUS FOR CHARGING A WELDING MACHINE FOR LIGHT BEAM GRATINGS

BACKGROUND OF THE INVENTION

So-called light beam gratings have been known for decades, and are used, particularly in industrial plants for the production of floors, for the rapid and weight-saving manufacture of false floors, for example, in boats or for covering window openings, etc. These known light beam gratings comprise interconnected supporting bars and crossbars, the crossbars also being called panel rods. The supporting bars and crossbars frequently are welded to each other.

In accordance with a relatively new method, the interconnection of the supporting bars and the crossbars or panel rods is effected by so-called "welding and pressing," namely by pressing the crossbar into the supporting bar under the action of a welding machine so that the supporting bar is not weakened by the pressed-in crossbar and the supporting bars and crossbars are connected, at the same time, and tightly, by the insertion of the crossbar.

When this machine, which has a very high capacity, is used, the continuous charging thereof with the two types of bars presents a problem, because the existing capacity can be utilized only by continuous charging of the machine.

SUMMARY OF THE INVENTION

This invention relates to the charging of a welding press for light beam gratings, and, more particularly, to a novel method of and apparatus for performing such charging.

The objective of the invention is to provide an apparatus for charging a welding machine, for light beam gratings, which insure that correctly dimensioned supporting bars are fed to the welding machine in correct number, corresponding to the width of the grating, and correctly spaced from each other, with the feeds and apparatus working continuously and preferably automatically to avoid any interruption in the working process.

In accordance with the invention, a continuous supporting bar strip arriving from a known straightening machine is cut to length and fed to a magazine from which, subsequently, the number of supporting bars required for a respective grating are lifted when the magazine is correspondingly filled. The lifted bars are fed to the welding and pressing machine with their top surfaces aligned in height, the necessary spacing of the bars being adjusted at the same time and all of the operations being performed in a continuous repetitive sequence which is automatically controlled.

With the apparatus of the invention, it is possible to store the supporting bars in the form of a steel strip, after it has been unwound from a storage reel and cut to length. The bars are removed from the magazine when the number of bars corresponding to the size of the grating have been stored in the magazine and are fed to the welding machine. In the removal of the bars from the magazine and the feeding of the bars to the welding machine, the top edges of the bars must be positioned, in elevation, in accordance with the elevation of the welding machine whose elevation is constant. At the same time, the spacing between individual supporting bars, that is, the spacing which the supporting bars are to have in the grating, must be adjusted during travel of the bars from the magazine to the welding machine.

Taking into consideration as the starting point of the invention method, namely the steel strip material rolled as a band to obtain the supporting bars and the arrangement of these supporting bars fed to the welding machine, the continuous supporting bar strip is first cut to length and then collected in a number corresponding to the number requisite for a particular size grating. The supporting bars are spaced apart the correct distance and aligned in elevation with the welding machine between the collection operation and the welding operation. All these different operations, which are also differently aligned in direction, are fully continuous and fully automatic in accordance with the invention.

The apparatus for performing the invention method comprises a table adjoining a known straightening machine, a shear arranged on the table, a supporting bar magazine charged from the table, a lifting truck cooperating with the support bar magazine, and an adjusting or spacing reed set between the lifting truck and a known welding and pressing machine.

In accordance with another feature of the invention, the shear is controlled by a limit switch which is actuated by the end of a supporting bar arriving from the straightening machine and guided on the table, a double-action or dual-limit switch being provided to control first the stopping of the straightening machine and then the cutting of the supporting bar. This is done in such a manner that, after the straightening machine has stopped, the supporting bar still can move a certain distance in using up the stored kinetic energy therein. Simultaneously, with actuation of the shear, a feeding device for feeding the supporting bar from the table to the magazine is also controlled.

The supporting bar magazine comprises several endless chains trained about horizontal rollers which are stepped by a chain length interval responsive to each insertion of a supporting bar to the magazine so that an empty chain magazine is always in front of the table. The feeding movement of the chains is effected by a conveyor cylinder whose piston rod cooperates with a stepping cam wheel.

The lifting truck provided in accordance with the invention can be moved back and forth in the direction of motion of the chains of the supporting bar magazine and is also simultaneously adjustable in height. The vertical reciprocation of the lifting truck is effected by inclined surfaces with which there cooperate rolling bodies supported in uprights of the lifting truck. These inclined surfaces are arranged on a bar extending parallel to the longer dimension of the lifting truck and moving parallel to the longer dimension, the lifting truck being stationary relative to its longer dimension. In addition, motor-driven pinions, rigidly positioned in the uprights, are provided and mesh with rack sections arranged on the bar so that, when the pinions are rotated, the racks and thus the bar and with the bar the inclined surfaces can be reciprocated back and forth. Thereby the elevation of the lifting truck, that is to say, the effective elevation thereof with respect to support of the bars can be adjusted. Thus the top edges of the supporting bars are adapted to the constant working level set in the welding machine.

The uprights of the lifting truck carry, on their upper ends, a plurality of disc wheels each of which serves to remove one supporting bar from the magazine. These disc wheels comprise two flat discs separated by a hub provided with a gripping surface, at least the hub being drivingly rotatable. The grippingness of the hub surface can be obtained by roughing a metal surface. It is also possible to obtain the necessary grippingness of the hub surface by using known slip-resistant plastics. In any case, the surface is so designed that the coefficient of friction between the surface and the supporting bar resting thereon is as great as possible.

In addition, the adjusting reed for setting the spacing of the supporting bars as the latter are fed to the welding machine is infinitely adjustable.

In accordance with the invention, the various actuators necessary for the plant are in the form of pneumatic actuators, since this is a type of drive which works safely, can be accurately controlled, and represents, at the same time, an inexpensive type of drive.

An object of the invention is to provide apparatus for charging a welding and pressing machine for light beam gratings formed of supporting bars and crossbars.

A further object of the invention is to provide such an apparatus in which a continuous supporting bar strip is fed through a straightening machine and then cut to the proper supporting bar lengths.

Another object of the invention is to provide such an apparatus in which the cut supporting bars are fed to a magazine.

A further object of the invention is to provide such an apparatus in which, when the number of supporting bars required for a selected size grating are accumulated in the magazine, these bars are lifted from the magazine.

A further object of the invention is to provide such an apparatus in which the height of the top surfaces of the lifted bars is adjusted to the level of the welding and pressing machine.

Another object of the invention is to provide such an apparatus in which the lifted bars are fed to the welding and pressing machine while the spacing of the lifting bars is adjusted.

Another object of the invention is to provide such an apparatus in which the method steps are preformed in a continuous repetitive sequence and the apparatus operates in an automatic continuous and repetitive cycle.

For an understanding of the principles of the invention, reference is made to the following description of a typical embodiment thereof as illustrated in the accompanying drawings.

BRIEF DESCRIPTION OF THE DRAWINGS

In the drawings:

FIG. 4 is an end elevation view of the device for effecting vertical reciprocation of the lifting truck.

DESCRIPTION OF THE PREFERRED EMBODIMENT

Figure 1:
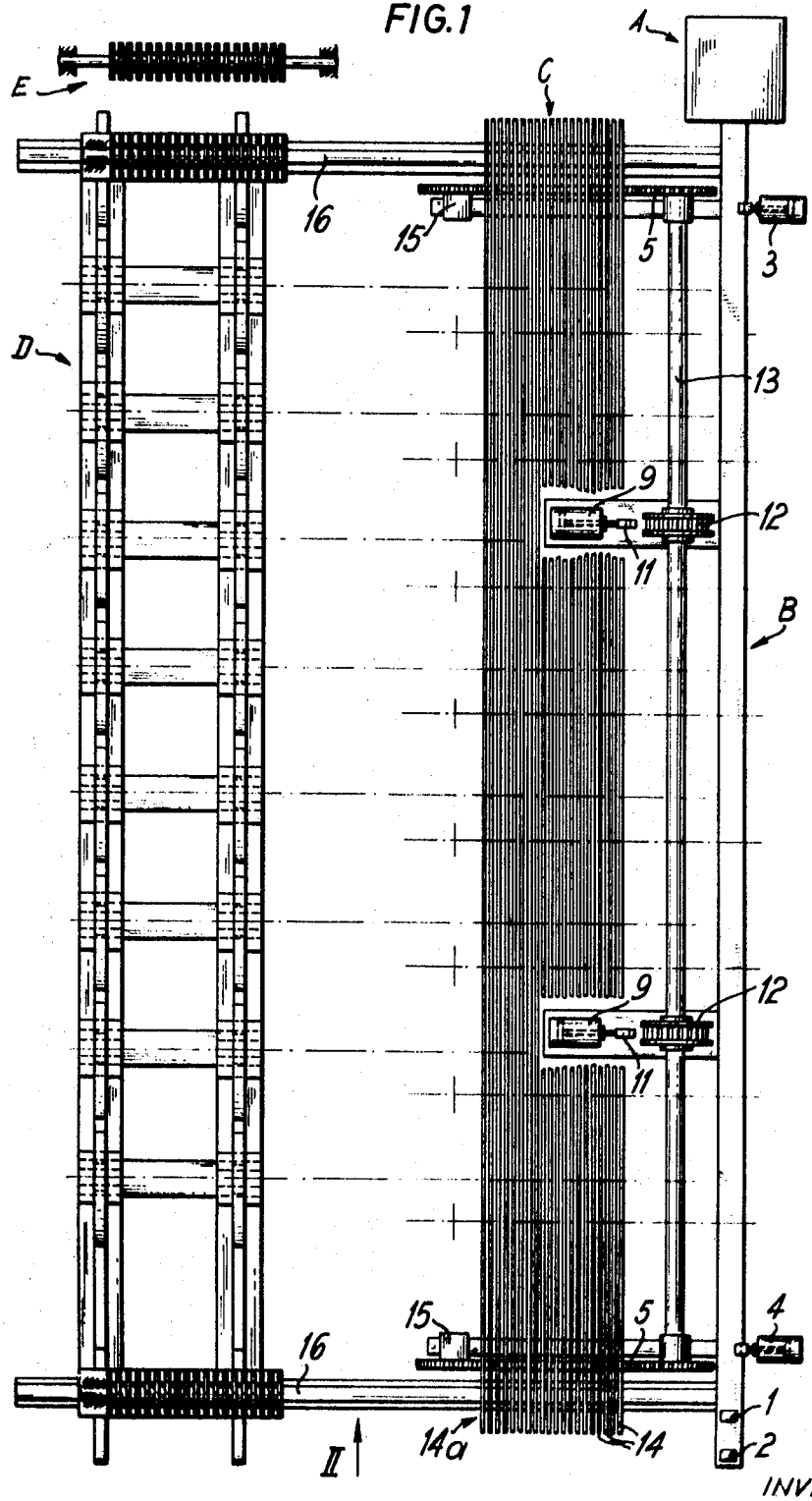
FIG. 1 is a schematic top plan view of the entire plant in accordance with the invention, will all parts that either are known or are not essential for an understanding of the invention being omitted.

Referring to FIG. 1 the apparatus of the invention includes a known shear *A*, a table *B*, a supporting bar machine *C*, a lifting truck *D*, and a space adjusting reed *E*. A known straightening machine, arranged in the working direction, ahead of shear *A*, and a known welding and pressing machine, adjoining in working direction, the adjusting reed *E*, have been omitted from the drawing for reasons of clarity.

Table *B*, adjoining shear *A*, is equipped with two limit switches 1 and 2 at its downstream end in the direction of flow of the supporting bar. Limit switch 1 is actuated by the supporting bar and acts on the feed of the straightening machine to stop this feed. When the supporting bar then arrives, due to its stored kinetic energy, at limit switch 2, shear *A* is actuated and, at the same time, several feed cylinders 3 and 4 are activated. These move the cut supporting bar, deposited on table *B*, in the direction of magazine *C*, namely so far that the bar arrives in a magazine compartment and is stored therein. Instead of the two cylinders 3 and 4 shown in the drawing several more cylinders may be provided. The feed of the straightening machine is restarted by the movement of cylinders 3 and 4, and shear *A* is again operated.

Figure 2:
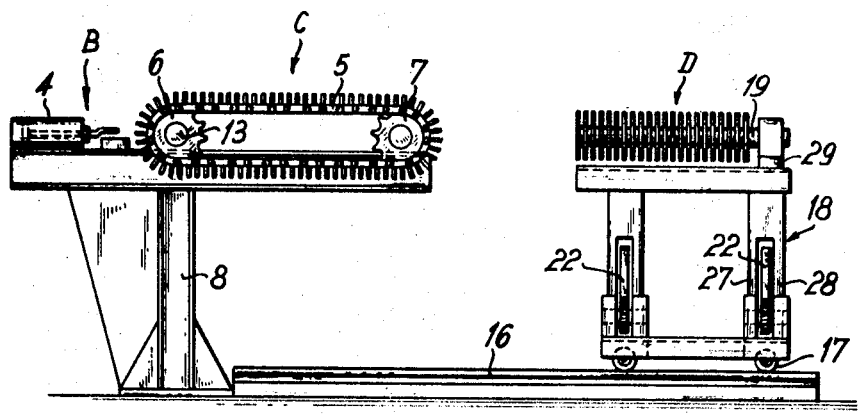
FIG. 2 is a side elevation of the plant shown in FIG. 1, looking in the direction of the arrow *I* represented in FIG. 1.

Supporting bar magazine *C* proper, which is represented more clearly in side elevation in FIG. 2, comprises endless chains 5 having individual magazinelike recesses or compartments, these chains being trained about rollers 6 and 7. These are arranged on a stand 8 which imparts the necessary strength to the magazine *C*.

Figure 3:
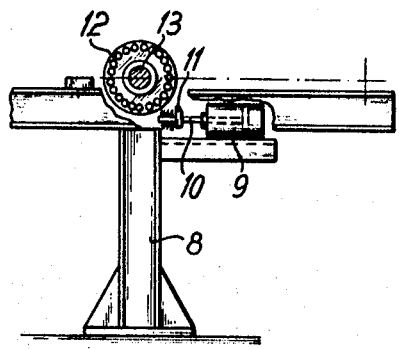
FIG. 3 is a schematic representation, on an enlarged scale, on the drive of the magazine chains.

Feeding movement of chains 5 is effected in the manner shown in FIG. 3, by a pneumatic actuator 9 whose piston rod is provided, at its free end, with a cam 11 which engages corresponding cam elements of a cam wheel 12. This cam wheel, or cam wheels, are fixed on a shaft 13 to which are fixed the wheels or sprockets 6 of the chains 5 so that driving of the chains is effected. It will be clear that, with each feed movement of cam 11, cam wheel 12 is moved by one interval of the cams arranged thereon so that sprockets 6 and cooperating sprockets 7 are also turned through one interval. Thereby, an empty magazine compartment carried by the chains is always opposite the surface of table *B* and thus ready to receive a supporting bar.

The bars mounted in magazine *C*, which are generally designated at 14 in FIG. 1, are stored in the magazine and picked up by lifting truck *D* when the latter is empty. Overfilling of magazine *C* is prevented by contact of bar 14*a* with limit switch 15.

Lifting truck *D* moves on tracks 16 and has, on its underside, rollers 17, which are arranged in the corresponding supporting frame. The supporting frame includes uprights 18 in which supports 26 are movable in a vertical direction. These supports carry, on the upper ends, rotatable shafts 19, the longitudinal extents of shafts 19 being perpendicular to the longitudinal extent of supporting bars 14 and thus parallel to the longitudinal extent of the tracks 16. On shafts 19, there are arranged disc wheels each of which consists of two large discs 20 and a hub 21 spacing the two large discs. Hubs 21 are so roughened on their surface that a maximum friction effect appears between each hub 21 and underside of the supporting bar resting thereon. The hubs 21, at least, are fixedly connected with shafts 19 for rotation therewith.

Uprights 18 are U-shaped at their bottom ends and receive, in the recesses provided between the two legs 27 and 28, a bar 22 which carries, on its upper surface, a plurality of inclined surfaces 23, as best seen in FIG. 4. Additional rollers 24 are provided in uprights 18, and cooperate with inclined surfaces 23. Pinions 25, which mesh with rack segments or rack sections provided on the bottom surface of bar 22, in the range of pinions 25, are also carried by uprights 18. Thus, when pinions 25 are driven, bar 22 can be horizontally reciprocated.

The lower ends of supports 26, arranged for vertical adjustment in uprights 18, carry wheels 24 and the upper ends of supports 26 carry crossbars 27 supporting shafts 19. It will be clear that, when bar 22 is reciprocated longitudinally of itself, an ascending and descending movement of shafts 19, that is, of supports 27, is attained by cooperation of wheels 24 with inclined surfaces 23.

Adjusting reed 24 also comprises a plurality of disc-shaped elements which are infinitely adjustable in their spacing from each other, so that, when a supporting bar strikes in two discs or guides, the supporting bars are either pulled apart or pressed together to the desired spacing from each other.

The method of operation of the apparatus will now be described. The straightened supporting bar strip, arriving from the not shown straightening machine, is guided through shear *A* and moves along table *B* until it comes in contact with the first limit switch 1 and operates this switch to stop the driving movement of the straightening machine. Despite the stopping of the straightening machine, the supporting bar strip still performs a small movement in the longitudinal direction and engages limit switch 2. Operation of limit switch 2 effects actuation of shear *A*, to sever the proper length of bar from the straightened strip. At the same time, feed cylinder 3 and 4 are actuated and move the cut supporting bar into the magazine chains 5. The piston rod with the cam 11, controlled by movement of the cylinder 4, is now started and the magazine chain is advanced by one magazine compartment so that an empty magazine is again opposite table *B*. As soon as such an empty magazine is opposite table *B*, another bar can be supplied.

When lifting truck *D* has delivered these bars to the welding machine, it is moved on track 16 toward magazine *C*, namely under supporting bars 14 which are stored in the magazine. Lifting truck *D* then performs a lifting movement and again receives, between the individual disc wheels, the supporting bars. A plurality of such disc wheels are provided for each supporting bar, and are spaced along the length of the supporting bar. Lifting truck *D* picks up a certain number of bars, over filling of magazine *C* being prevented by limit switch 15.

After the supporting bars are mounted in the disc wheels of the lifting truck, the latter moves in such a way that it lifts the supporting bars out of the chains 5 and then moves away from magazine C. The lifting truck D equalizes the elevation of the supporting bars so that the top edges of the supporting bars are always at a constant level, namely the level which represents the true level of the welding and pressing unit. This equalization of height is necessary since supporting bars of different height are used. Such equalization can be effected, on the one hand, by an adjustment in the lifting truck in which the usual height dimensions of the bars are programmed in.

Shafts 19 are now rotated so that supporting bars 14, which now pass over from magazine C to lifting truck D, are advanced in their longitudinal direction. The supporting bars 14 thus have performed three movements up to this time, namely the movement parallel to their lengths from the straightening machine to table B, to the supporting bar magazine C, and subsequently from supporting bar magazine C to lifting truck D. They are then moved forwardly again parallel to their lengths to the welding machine.

Before the supporting bars arrive in the welding machine, they must pass through the adjusting reed E comprising a plurality of conically tapered cams which are infinitely adjustable as to their spacing, so that the supporting bars can be adjusted in their spacing to each other transversely of their lengths, the spacing being a distance which corresponds to the spacing of the supporting bars in the finished light beam grating.

The use of the inclined surfaces shown in FIG. 4 permits a completely uniform elevation of shafts 19 over the entire length of the unit, the vertical adjustment being uniformly constant on all shafts and independent of different weights.

It will be clear that the apparatus of the invention and the method of the invention provide a completely continuous and completely automatic feeding system for steel materials supplied in rolls.

Naturally, the invention is not limited to the illustrated embodiment and modifications are possible without departing from the spirit of the invention. For example, the invention is not limited to use with the welding and pressing machine, but also can be used in connection with other machines.

I claim:

1. Apparatus for charging a welding and pressing machine for light beam gratings formed of supporting bars and crossbars, said apparatus comprising, in combination, a relatively elongated table arranged to receive therealong, from one end thereof, a continuous supporting bar strip which has been straightened in a straightening machine; a shear adjacent said one end of said table and operable to cut the continuous supporting bar strip into proper supporting bar lengths; a supporting bar magazine positioned to receive the cut supporting bars from said table; a lifting truck cooperable with said supporting bar magazine to lift cut supporting bars therefrom and to feed the cut supporting bars to the welding and pressing machine; and an adjusting reed in the path of bars moved by said supporting bar magazine to the welding and pressing machine and operable to adjust the lateral spacing of the supporting bars.

2. Apparatus for charging a welding and pressing machine, as claimed in claim 2, including limit switch means adjacent the opposite end of said table and actuated by the continuous supporting bar strip received along said table; said limit switch means controlling operation of said shear to cut the straightened supporting bar strip to the proper supporting bar lengths.

3. Apparatus for charging a welding and pressing machine, as claimed in claim 3, in which said limit switch means, when actuated, initially interrupts feeding of the strip by the straightening machine and then activates said shear to cut the supporting bar strip to the proper supporting bar lengths.

4. Apparatus for charging a welding and pressing machine, as claimed in claim 4, in which said limit switch means comprises a double-action limit switch.

5. Apparatus for charging a welding and pressing machine, as claimed in claim 4, in which said limit switch means comprises two limit switches successively actuated by the straightened supporting bar strip.

6. Apparatus for charging a welding and pressing machine, as claimed in claim 3, including feeding devices operable, when actuated, to feed a supporting bar from said table to said magazine; said feeding devices being activated responsive to actuation of said shear.

7. Apparatus for charging a welding and pressing machine, as claimed in claim 2, in which said supporting bar magazine comprises plural endless chains trained around sprockets rotating about spaced horizontal shafts, each chain-carrying rod-receiving means spaced uniformly therealong; and means operable, responsive to each insertion of a supporting bar into the rod-receiving means, to advance said chains by the interval between adjacent rod-receiving receiving means.

8. Apparatus for charging a welding and pressing machine, as claimed in claim 8, in which said last named means comprises a piston-cylinder actuator having a piston rod; and a cam wheel rotatable with said sprockets; said piston rod cooperating with said cam wheel to advance said chains.

9. Apparatus for charging a welding and pressing machine, as claimed in claim 2, including means supporting said lifting truck for horizontal reciprocation parallel to the direction of movement of said chains; and adjusting means operable to adjust the height of said lifting truck.

10. Apparatus for charging a welding and pressing machine, as claimed in claim 10, including automatic means controlling the horizontal reciprocation of said lifting truck.

11. Apparatus for charging a welding and pressing machine, as claimed in claim 10, in which said height adjusting means comprises longitudinally reciprocable inclined surfaces; said lifting truck including uprights having movable portions; and roller means on said movable portions cooperating with said inclined surfaces.

12. Apparatus for charging a welding and pressing machine, as claimed in claim 12, in which said truck has its longer dimension transverse to the direction of the horizontal reciprocation; and a bar extending parallel to the longer dimension of said lifting truck and carrying said inclined surfaces, said bar being reciprocable parallel to the longer dimension of said lifting truck.

13. Apparatus for charging a welding and pressing machine, as claimed in claim 13, including motor driven pinions rigidly positioned on said uprights; and rack means on said bar meshing with said pinion.

14. Apparatus for charging a welding and pressing machine, as claimed in claim 8, in which said lifting truck comprises a plurality of disc wheels arranged on horizontal shafts extending parallel to the direction of movement of said chains and arranged in alternation with said chains,; each set of disc wheels correspondingly positioned on respective shafts being operable to pick one supporting bar from said magazine.

15. Apparatus for charging a welding and pressing machine, as claimed in claim 15, in which each disc wheel comprises two flat discs spaced by a common hub having a smaller diameter then the associated discs; said hub having a grippy surface; and means operable to rotate at least said hubs.

16. Apparatus for charging a welding and pressing machine, as claimed in claim 16, in which each hub has a roughened metallic surface constituting said grippy surface.

17. Apparatus for charging a welding and pressing machine, as claimed in claim 2, in which said adjusting reed is infinitely adjustable with respect to its function of laterally spacing the supporting bars.

18. Apparatus for charging a welding and pressing machine, as claimed in claim 9, including a piston-cylinder feeding devices operable to feed-supporting bars from said table to said supporting bar magazine responsive to actuation of said shear.

19. Apparatus for charging a welding and pressing machine, as claimed in claim 19, in which said piston-cylinder devices are pneumatic devices.